June 18, 1935.    A. RONNING    2,005,243
POWER OPERATED CONTROL MECHANISM
Original Filed Aug. 11, 1928    2 Sheets-Sheet 1

INVENTOR
ADOLPH RONNING
BY
ATTORNEY

June 18, 1935.    A. RONNING    2,005,243
POWER OPERATED CONTROL MECHANISM
Original Filed Aug. 11, 1923    2 Sheets-Sheet 2

INVENTOR
ADOLPH RONNING
BY
ATTORNEY

Patented June 18, 1935

2,005,243

UNITED STATES PATENT OFFICE 2,005,243

POWER OPERATED CONTROL MECHANISM

Adolph Ronning, Minneapolis, Minn.

Original application August 11, 1928, Serial No. 298,926. Divided and this application October 14, 1932, Serial No. 637,745

17 Claims. (Cl. 37—156)

This invention relates to mechanisms for controlling the operative positions of implements with respect to the vehicles or frames upon or from which they may be carried or suspended while in operation, and the primary object is to provide such a mechanism that will be manually controlled but power operated so that adjustments of the implement may be readily made without appreciable manual effort yet quickly and in complete response to the operator's wishes. A further object is to provide such a mechanism in conjunction with implements such as grader blades, where both vertical and angular adjustments are required, and to so construct the mechanism that a single control member will be sufficient to effect all of the necessary tool adjustments. These and still other more detailed and specific objects will be disclosed in the course of the following specification, reference being had to the accompanying drawings, wherein:

Figure 1:
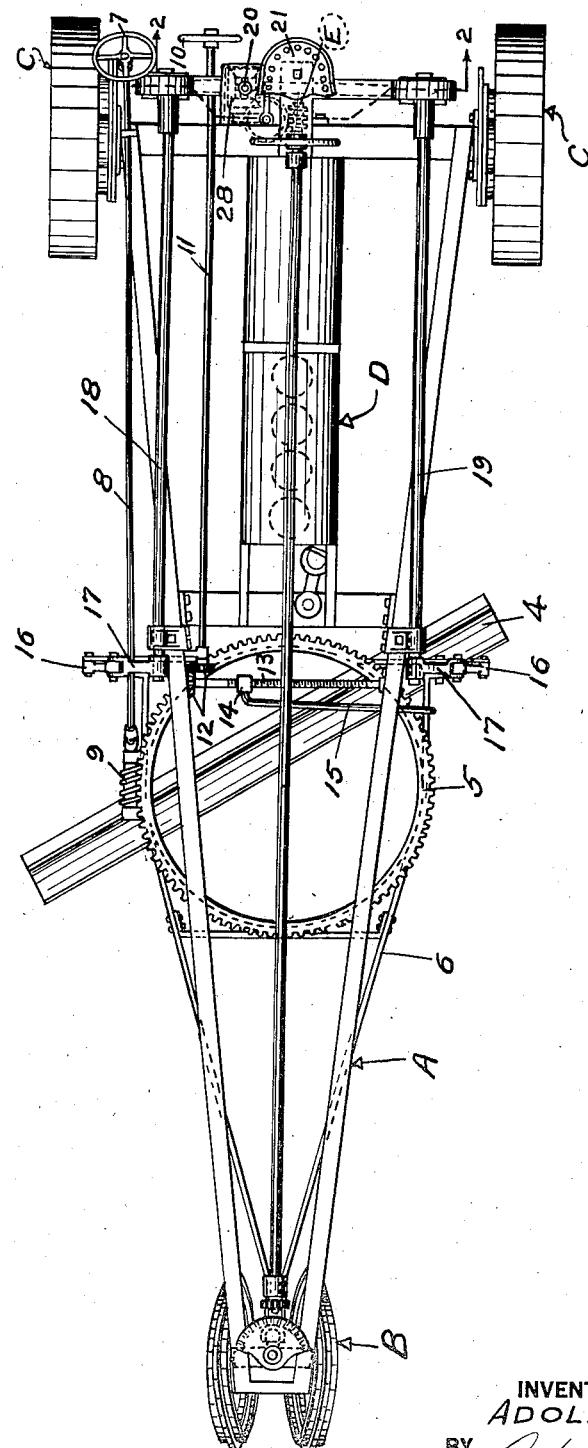
Fig. 1 is a plan view of a power grader showing my improved control mechanism as applied thereto.
Figure 3:
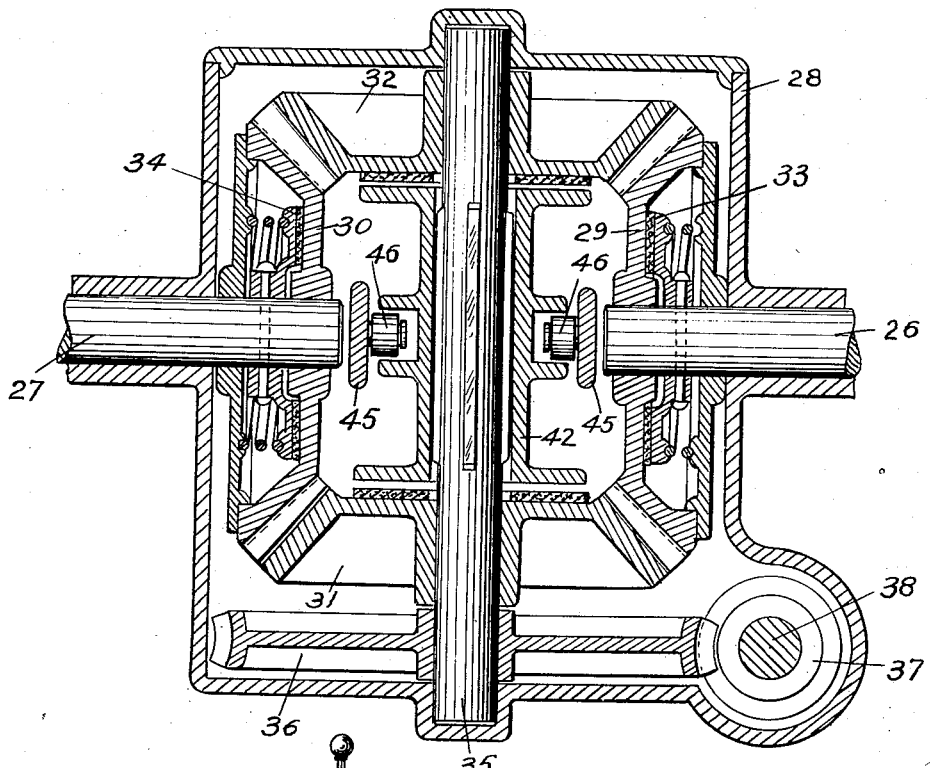
Fig. 3 is an enlarged detail section through a portion of the control mechanism, and as on the line 3—3 in Fig. 2.
Figure 2:
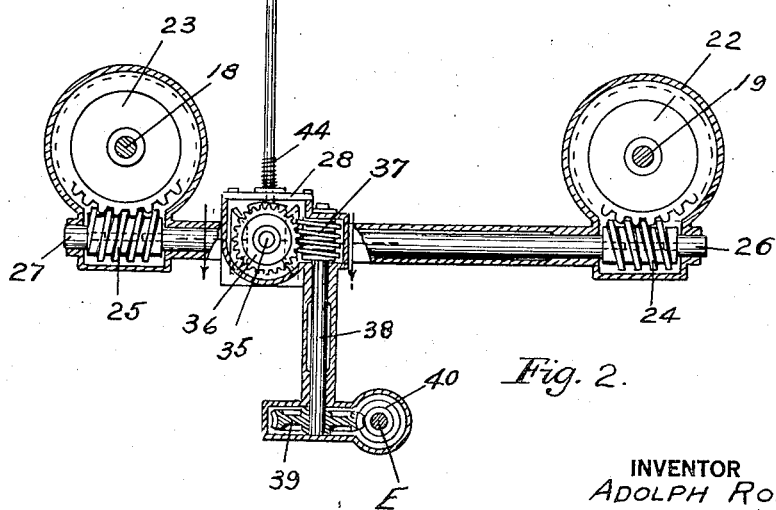
Fig. 2 is an enlarged detail sectional elevation as seen substantially on the irregular line 2—2 in Fig. 1.

Figs. 1, 2, and 3 correspond to Figs. 2, 3, and 4, respectively, of my copending patent application Ser. No. 298,926, filed August 11th, 1928, for Road maintainer, now Patent No. 1,883,404 issued October 18th, 1932, of which the present application, insofar as the claimed subject matter is concerned, is a division.

Referring to the instant drawings, more particularly and by specific reference characters, A designates a main vehicle frame, supported on a steering carriage B, at its forward end and upon traction wheels C at its rear end. These traction wheels are driven by a power unit or engine, designated generally as D, and may comprise tractor parts harnessed into the frame A as disclosed in Ronning and Ronning Patent No. 1,658,354, dated February 7th, 1928. Insofar as the present invention is concerned, the power unit or engine D may be of any suitable design or construction, and it is only of primary consideration that power means be provided for operating a drive shaft, designated as E, in Figs. 1 and 2, for producing a continuous motion independent of the travel movement of the machine.

The working implement 4 as here illustrated is a grader blade of conventional form, and is carried by a "circle" 5, in turn mounted in a secondary, or under frame 6. The circle is rotatably adjustable under the action of a hand wheel 7, a shaft 8, and worm 9, to thus effect angular adjustments of the blade 4 with respect to the line of draft or direction of travel.

The frame 6 is shifted transversely with respect to the main frame by a hand wheel 10, operating through a shaft 11 and bevel pinions 12 to turn a screw shaft 13 upon which operates a traveler nut 14 having a link connection 15 with the frame 6.

To adjust the blade vertically, or angularly with respect to the road surface, as must more frequently be done during the operation of the machine, it is necessary to effect a vertical or lateral adjustment to the frame 6, and to this end its rear outer extremities are attached to link bars 16, which are in turn suspended from cranks 17 of control shafts 18 and 19. Thus by simultaneously or independently rotating the shafts 18 and 19 the desired vertical and angular adjustments to the blade 4 will be effected. The problem is now reduced to one of transmitting the continuous rotary motion of the drive shaft E, selectively, and in either direction, or simultaneously in corresponding directions to the shafts 18 and 19, all under the control of a single manually operative shift lever. Such a lever is indicated at 20, and as shown in Fig. 1 is within convenient reach of an operator when stationed on the seat 21 at the rear of the machine. The power transmitting mechanism proper is illustrated in Figs. 2 and 3 and may be described as follows:

The rear ends of the shafts 19 and 18 are provided with encased worm gears 22 and 23 that mesh, respectively, with worms 24 and 25 carried at the outer ends of shafts 26 and 27, and by which said worms and gears are driven.

The opposed ends of the shafts 26 and 27 extend into and are journaled in a housing 28, within which housing are arranged four rectangularly disposed (Fig. 3) bevel gears 29, 30, 31, and 32, each of which constantly intermeshes with two of the others, in the manner shown. The gears 29 and 30 are respectively carried by the shafts 26 and 27 and are normally held in driving engagement therewith by spring held friction clutches 33 and 34, contained within the gears which are hollow. It may here be explained that the shafts 26 and 27 are so mounted that they have freedom for limited sliding movements, and when either of them is pushed outwardly it will carry with it the friction disk of the clutch, so as to release the same from the gear and thus permit the latter to rotate without rotating the shaft. The gears 31 and 32 are carried upon a stub shaft 35, that normally idles within these gears which are normally free of driving engagement with the shaft. The shaft 35 has a worm gear 36 meshing with a worm 37 on a shaft 38 having a worm gear 39 meshing with a worm 40 on the drive shaft E of the tractor engine D. When the engine is running the parts 35 to E, inclusive, are continuously running.

A clutch collar 42 is slidably keyed upon the shaft 35, between the two bevel gears 31 and 32, and is provided with friction faces, at its ends, for selective driving contact with the said gears. This clutch collar is operated by the shipper lever 20 which is universally pivoted in the housing 28 so that it may be moved in any direction, much as with the gear shift lever of a motor vehicle. A spring 44 (Fig. 2) secured to the casing 28 tends to return and hold the lever in an inactive vertical position. The lower end of the lever is bifurcated, having two fingers 45 provided with roller pins 46, traveling in an annular channel of and for longitudinally shifting the sleeve 42 on the shaft 35. It will be noted that the fingers 45 are only slightly spaced from the ends of the shafts 26 and 27, which project slightly within the gears 29, 30, and that there is sufficient play between the members 45 and 42 to permit a slight transverse movement of the fingers whereby they may act against the shafts 26, 27 and thereby selectively disengage the clutches 33 and 34.

When the shipper lever is pulled straight back it closes the clutch connection between the members 42 and 31. This action applies power from the engine driven shaft E to the gear 31, causing all the gears 29—32 to rotate, and transmitting motion through the elements 29, 30, 33, 34, 26, 27, 22, 23, 19, 18, and raises the crank arms 17, and consequently lifting both sides of the frame 6. When the shipper lever 20 is pushed forward it closes a driving contact of the sleeve 42 with the gear 32, thus reversing the direction of transmitted motion and causing the frame 6 and blade 4 to be lowered.

When the operator desires to, for instance, raise only one side of the frame 6, and the implement carried thereby, he pulls the lever 20 back but at the same time pushes it to one side, and by so doing he presses one of the opposite shafts (26 and 27) outwardly thus disengaging it from driven action. When so disengaged the shafts 19 and 26, or 18 and 27, will be locked against rotation, under the influence of the weight of the frame 6 which it supports, by reason of the worm gear drive connections 22, 24, or 23, 25. It will thus be seen that by slightly moving and pressing the lever 20 back and forth and from one side to the other, the operator is able, with a minimum amount of effort, to raise, lower, and incline the road working mechanism with a precise degree of accuracy and with a sufficient amount of geared down power, regardless of how heavy the frame 6 and supported implement mechanism may be.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A mechanism for adjusting vertical and angular positions of an implement carried by a travelling machine frame, comprising a pair of movable support members connecting the implement with the frame, a continuously rotatable power driven shaft, a single manually operative control element, and operative connections between said element, shaft and support members capable of translating selected movements of the control element under power from the shaft to either or both of said support members.

2. A mechanism for adjusting vertical and angular positions of an implement carried by a travelling machine frame, comprising a manually operative control member mounted for selective movement in a plurality of directions, a continuously rotatable power driven shaft, means operative upon movement of the control member in one predetermined direction for applying power from the shaft to adjust one side of the implement, and means operative upon movement of the control member in another predetermined direction for applying power from the shaft to adjust the other side of the implement.

3. An implement adjusting mechanism for an earth working machine comprising a continuously rotatable power driven shaft, laterally arranged adjusters supporting the implement, a forwardly, rearwardly, and transversely shiftable manually operative member, and means controlled by said member for selectively or simultaneously connecting said adjusters with said power shaft.

4. In a road machine the combination comprising a transversely arranged implement mounted for vertical and angular adjustment relative to the road surface, a continuously rotatable power operated shaft, power transmitting mechanisms normally permitting idle rotation of the shaft but associated with the shaft to transmit power therefrom for effecting said adjustments, and a single manually operative device for effecting operative connection of said transmitting mechanisms, with respect to the shaft.

5. In a road machine the combination comprising a transversely arranged implement mounted for vertical and angular adjustment relative to the road surface, a continuously rotatable power driven shaft, power transmitting mechanism including intermeshing gears associated with the shaft for effecting said adjustments, clutch devices operatively connecting said power shaft with said intermeshing gears, and a single manually operative lever for operating said clutch devices.

6. In a road machine having an implement and adjustable supports therefore, a motor, power transmitting mechanism for operatively connecting the motor with said supports, to adjust the operative position of the implement by motor power, and a hand lever operatively associated with the transmitting mechanism for effecting connections and disconnections therein as between the motor and either of said supports.

7. In a road machine having an implement and adjustable supports therefore, a motor, a shaft adapted to be continuously rotated by the motor, power transmitting mechanism for connecting the shaft with said supports, to adjust the implement by motor power, and a hand lever operatively associated with the transmitting mechanism for effecting connections and disconnections therein as between the motor driven shaft and either or both of said supports, selectively, to thereby and correspondingly effect angular or vertical adjustments to the implement.

8. A control mechanism, for a travelling machine having a driven shaft continuously rotatable in one direction under motor power and an implement adjustably connected with a pair of adjuster shafts, comprising clutch mechanisms and gears for establishing operative connections between the shafts, and a manually operative control lever extending from the clutch mechanism and for establishing power connections from the driven shaft through the gears selectively to the respective adjuster shafts and in either direction while the driven shaft rotates in its said one direction.

9. A control mechanism, for a road machine having a driven shaft continuously rotatable in one direction under motor power and an implement adjustably connected with a pair of adjuster shafts, comprising clutch mechanisms and gears for establishing operative connections between all the said shafts, and a manually operative control lever extending from the clutch mechanism and for establishing power connections from the driven shaft through the gears to the adjuster shafts selectively, to thereby angularly adjust the implement, and for establishing power connections between the driven shaft and both said adjuster shafts to thereby effect vertical adjustments to the implement without altering the angular position thereof.

10. A mechanism for adjusting the operative position of an implement carried by a traveling machine frame, comprising a continuously rotatable power driven shaft a manually operative control member mounted for selective movement in a plurality of directions, means operative upon movement of the control member in one predetermined direction for establishing power connection with the shaft to adjust one side of the implement, and means operative upon movement of the control member in another predetermined direction for establishing power connection with the shaft to adjust the other side of the implement.

11. A mechanism for adjusting the operative position of an implement carried by a traveling machine frame, comprising a motor driven shaft continuously rotatable in one direction, a pair of movable support members connecting the implement with the frame, a single manually operative control element, and operative connections between said element and support members capable of translating power from the shaft, by selected movements of the control element, to either or both of said support members.

12. The combination with an adjustable implement of a machine frame, of a control mechanism for adjusting the operative position of said implement comprising a pair of driven shafts operatively connected with lateral portions of the implement to vertically adjust the same when the shafts are turned, a power operated driving shaft disposed intermediate spaced ends of the driven shafts and arranged at right angles with respect thereto, and a manually operative clutch mechanism for establishing power transmitting connections between the driving shaft and said driven shafts selectively or simultaneously.

13. In a road grader, the combination of a grading blade, an engine, a main shaft driven thereby, a pair of countershafts adapted to be driven by the main shaft, clutches and gears for establishing driving connection between the main and the countershafts, mechanical connections from said clutches and gears to control the blade, said clutches being operative to operatively interconnect said gears with the main and countershafts to raise or lower the blade bodily or to tilt the blade to opposite inclinations.

14. In a road grader, the combination of an engine, a main shaft and a pair of countershafts, the main shaft being driven by the engine, gear connections from the main to the countershafts, said gears having a constant intermeshing relationship, clutches associated with said gears, a grader blade, connections from the countershafts to the blade, said gears being operative through said clutches to selectively actuate the countershafts and thereby bodily raise or lower the blade or to tilt the blade in opposite directions.

15. In a road grader, the combination of a main shaft and a pair of countershafts, means to continuously drive the main shaft, a gear connection between the main and countershafts, a clutch element on each of said shafts, a blade, and connections between the countershafts and the blade, the clutch elements being operative to form connections between the main and countershafts to bodily raise or lower the blade or to tilt the blade in opposite directions.

16. In a road grader, a grader frame, a pair of rock shafts journaled thereon each having a crank and a link, a blade frame connected to the links, said frame carrying a blade, an engine, a drive connection from the engine, intermeshing gears and clutches associated with said gears, connections from the gears to said rock shafts, and means to operate said clutches whereby the rock shafts may be rotated simultaneously in opposite directions to bodily raise or lower the blade frame or may be operated in the same direction to tilt or incline the blade frame.

17. In a road working apparatus, a grader having a scraper blade, lifting devices for adjustably supporting said blade, a power-operated control mechanism for actuating said lifting devices, said mechanism being of unitary construction and including a pair of control shafts having operative connections with said lifting devices, a clutch member on each control shaft, a pair of gears journaled for rotation one about each of said shafts driven from a source of power and adapted for driving engagement with said clutch members, and means for shifting said clutch members into and out of driving engagement with said gears to selectively control the operation of said lifting devices.

ADOLPH RONNING.